United States Patent [19]

Stillman

[11] 4,309,466
[45] Jan. 5, 1982

[54] FLEXIBLE LAMINATED PACKAGING MATERIAL COMPRISING METALLIZED INTERMEDIATE LAYER

[75] Inventor: Nathan Stillman, Walnut Creek, Calif.

[73] Assignee: Champion International Corporation, Stamford, Conn.

[21] Appl. No.: 104,562

[22] Filed: Dec. 17, 1979

[51] Int. Cl.³ .............. B32B 15/08; B32B 27/08; B32B 27/30; B65D 85/72
[52] U.S. Cl. ................... 428/35; 206/524.2; 220/453; 426/126; 426/127; 428/458; 428/461; 428/463; 428/476.3; 428/476.9; 428/483; 428/516; 428/518; 428/910
[58] Field of Search ............. 206/524.2; 229/3.5 MF; 426/126, 127; 428/910, 35, 458, 461, 463, 476.3, 476.9, 483, 516, 518; 220/453

[56] References Cited

U.S. PATENT DOCUMENTS

| | | | |
|---|---|---|---|
| 3,423,231 | 1/1969 | Lutzmann | 174/110 SR |
| 3,442,687 | 5/1969 | Hagan | 427/407 E |
| 3,556,816 | 1/1971 | Nughes | 428/220 |
| 3,616,190 | 10/1971 | Shaw | 428/126 |
| 3,753,769 | 8/1973 | Steiner . | |
| 3,770,122 | 11/1973 | Thiele | 206/524.2 |
| 3,932,693 | 1/1976 | Shaw | 426/127 |
| 3,997,383 | 12/1976 | Bieler et al. | 428/474 |
| 4,085,244 | 4/1978 | Stillman | 428/910 |
| 4,096,309 | 6/1978 | Stillman | 428/457 |
| 4,182,457 | 1/1980 | Yamada et al. | 426/127 |
| 4,190,477 | 2/1980 | Ossian et al. | 428/461 |
| 4,211,811 | 7/1980 | Bordini et al. | 156/334 |
| 4,216,268 | 8/1980 | Stillman | 428/425.8 |

FOREIGN PATENT DOCUMENTS 1378140 12/1974 United Kingdom ............... 426/126

Primary Examiner—James C. Cannon
Attorney, Agent, or Firm—Evelyn M. Sommer

[57] ABSTRACT

A laminated packaging film useful in producing such items as containers or pouches for liquid or semi-liquid matter, comprises an outer web of balanced biaxially-oriented thermoplastic material, a middle web of metallized thermoplastic material and an inner web of heat-sealable polyolefin. A vinylidene chloride polymer coating is provided on at least one of the outer or middle web. The pouches and containers formed by this film are exceptionally strong, durable and flexible.

10 Claims, 2 Drawing Figures

FLEXIBLE LAMINATED PACKAGING MATERIAL COMPRISING METALLIZED INTERMEDIATE LAYER

CROSS-REFERENCE TO RELATED APPLICATION

Reference is made to my copending application Ser. No. 104,799, filed 12-18-79, entitled "Flexible Packaging Composite".

BACKGROUND OF THE INVENTION

The present invention relates to a composite flexible film of highly improved properties. More particularly, the present invention relates to a packaging film for forming self-sealed pouches which may be easily transported in essentially flat, compressed form and which are capable of retaining 5 to 20 or more liters of liquid content without succumbing to the physical stresses caused by movement or shift of the liquid, semi-liquid or solid contents within the containers.

Conventional containers for transporting and storing large volumes of liquid, e.g., ketchup, syrup, wine or the like, involve the use of rigid containers of fixed dimensions, such as cans and cartons. These rigid containers have numerous drawbacks. Due to their rigid construction, the rigid containers must be unusually strong to withstand the physical stresses exerted by the liquid or other matter within the container. This is particularly true with larger volumes of liquid or semi-liquid materials which may shift during transport. Moreover, the use of a rigid container of heavy construction makes it uneconomical to transport such containers unless they are filled. Even when empty, the rigid containers occupy their full volume. Therefore, for commercial use, the rigid containers must be produced close to the site of the filling and may not be reused, due to the high transport cost.

The flexible packaging film, and container produced therefrom, of the present invention permits the production of a lightweight, flexible container which may be employed to package substantial volumes and/or weights of liquid, semi-liquid and solid materials. The flexibility and strength of the film of the present invention, even for large containers, permits the container to contain volumes of, for example, from 5 to 20 liters, and weights of, for example, 20 to 30 kilograms. Moreover, since the film and the containers formed therefrom are flexible, the containers of the present invention may be compressed into essentially flat form when they are empty to permit them to be easily and economically shipped, stored, transported and reused in both the filled and empty conditions.

Additionally, the flexibility of the films permits the container formed therefrom to withstand greater physical stresses, caused by shifting of the container's contents, than rigid containers. The physical stresses caused by the contents shifting may be absorbed by movement and stretching of the container wall. This enables the containers to be composed of material of significantly lower strengths and weight than those employed in rigid containers. Such films are disclosed in U.S. Pat. Nos. 4,085,244 and 4,096,309 to Stillman. However, difficulties have been experienced with the use of such films.

SUMMARY OF THE INVENTION

It is an object of the present invention to provide a composite, flexible packaging film which is self-sealing and of high strength.

Another object of the present invention is to provide a composite, flexible packaging film in which the various layers of the composite packaging film are arranged in a sequence which provides maximum interlayer cooperation, and simplifies and facilitates manufacture of the film.

A further object of the present invention is to provide a composite, flexible packaging film with exceptionally high flex resistance which is useful for forming containers for large volumes of liquid or semi-liquid matter.

A still further object of the present invention is to form a flexible self-sealing container of flexible, laminated material which is collapsible and which may be commercially and efficiently stored and transported whether filled or empty, and which is capable of retaining contents of great weight and volume.

The foregoing objects are attained by providing a composite, flexible packaging film comprising an outer web of balanced biaxially-oriented thermoplastic material, a middle web of metallized thermoplastic material, and an inner layer of heat-sealable polyolefin, with at least one of the outer and middle webs having a vinylidine chloride polymer coating thereon.

Other objects, advantages and salient features of the present invention will become apparent from the following detailed description, which, when taken in conjunction with the annexed drawings, discloses a preferred embodiments of the present invention.

BRIEF DESCRIPTION OF THE DRAWINGS

Referring to the drawings which form a part of this disclosure.

DETAILED DESCRIPTION OF PREFERRED EMBODIMENTS OF THE INVENTION

Figure 1:
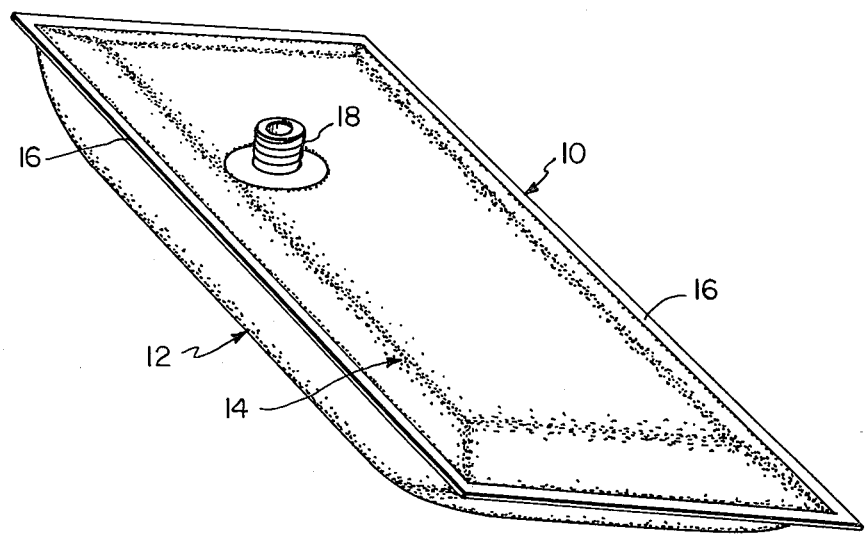
FIG. 1 is a perspective view illustrating a container formed in accordance with the present invention.

Referring to FIG. 1, a container in the form of a pouch 10 is illustrated. The pouch 10 is formed from two separate sheets 12, 14 of the composite, flexible packaging film. The perimeter portions 16 of the sheets 12, 14 are heat-sealed together to retain the contents of the pouch 10 therein. A screw spigot 18 may be provided in the sheet 14 to facilitate filling and emptying of the pouch of its liquid or semi-liquid contents.

In an alternative embodiment, not shown, a pouch similar to that illustrated in FIG. 1, may be formed from a single sheet of film. Thus, a single sheet of film may be folded 180° at is midpoint and then heat-sealed at its outer periphery along the remaining edges to form a unitary pouch. With this arrangement, only three, instead of four, edges need be heat-sealed.

Figure 2:
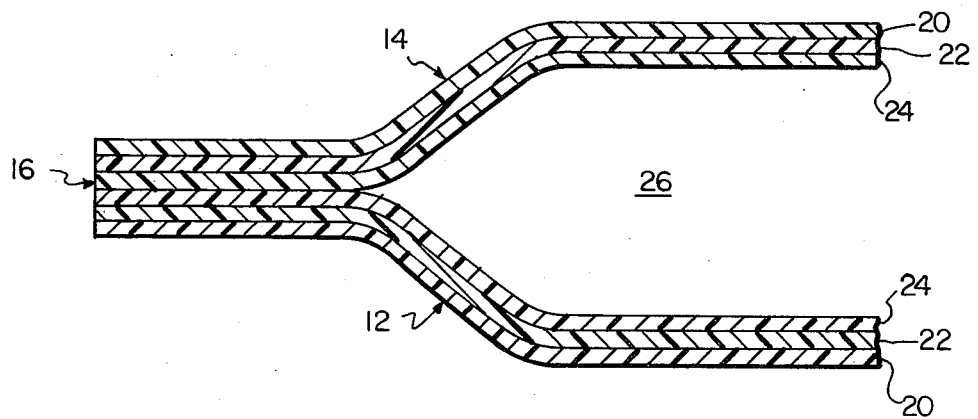
FIG. 2 is a partial elevational view in cross section illustrating the composite, flexible packaging films used to form the container of FIG. 1.

FIG. 2 graphically illustrates (i.e., not to scale) in cross section the laminated arrangement of the sheets 12, 14. Each of the sheets 12, 14 has three webs. These webs are, in order, from the outside to the inside of each sheet, an outer web 20 of balanced biaxially-oriented thermoplastic material, a middle web 22 of metallized thermoplastic material, and an inner web 24 of heat-sealable polyolefin. Either the outer web 20 or the middle web 22 is provided with a coating of a vinylidene chloride polymer. When the two sheets 12, 14 are sealed, as shown in FIG. 2, along the perimeter portions 16, an internal cavity 26 is defined therein in which the contents of the container are to be entrapped.

The outer web 20 is preferably formed of a polyamide, such as nylon, or polypropylene. Since the outer web 20 is biaxially oriented in essentially balanced degree, the outer web provides substantial flex-crack resistance. Additionally, the balance biaxial orientation results in the film being strongly resistant to bursting and tearing.

The outer web may be coated on one or both of its surfaces with a vinylidene chloride polymer (saran). One example of a polypropylene film having a vinylidene chloride polymer coating on both sides thereof is Propafilm C, manufactured by ICI United States, Inc. Another film which may be employed is Japanese Emplar OV which is a polyvinyl alcohol film having saran coatings on both sides thereof.

The middle web 22 may comprise a metallized polyester or polypropylene. The metal is preferably aluminum. The middle web 22 is metallized by vacuum deposition (e.g., of the type presently practiced by the Hysil Company in the United States).

By metallizing the middle web 22 of the sheets 12, 14, the necessity of providing a layer of metal foil within the film laminate is obviated. Metallizing the middle web 22 provides excellent protection from ultraviolet light, high resistance to vapor penetration, and an excellent barrier to the penetration of liquids, particularly water or moisture, through the film.

As noted above, the saran coating may also be provided on the middle web 22. An example of such web is XMP-750 Mylar which is manufactured by DuPont and comprises a metallized polyester film coated on both sides thereof with saran.

The inner or sealing web 24 is formed of a heat-sealable polyolefin. This web 24 enables the sheets 12, 14 to be sealed at their perimeter portion 16 by heat-sealing in order to form a pouch 10. The polyolefin layer may be an ethylene copolymer (e.g., that distributed by DuPont of Canada under the trademark SCLAIR). The thickness of the polyolefin layer 24 is between about 0.5 mil to 5 mils (0.0005 to 0.005 inch), and is preferably 0.0015 to 0.003 inch. The inner polyolefin web also contributes to the impermeability of the film of the present invention.

Another polyolefin which may be used is rubber modified high density polyethylene. Although polyethylene may also be used for the inner sealing web, the ethylene copolymer and the rubber-modified high density polyethylene are preferred since they have the advantage of contributing greater strength to the packaging film.

The webs 20, 22, 24 may be secured by conventional adhesives used to effect lamination, for example, polyethylene or ethyl acrylic acid copolymers. Additionally, saran adhesives may be used. It is possible that the use of saran adhesives may be satisfactory in providing the required saran coating to the film.

It may also be desirable to treat various of the layer surfaces to improve the adhesion and integrity of the present invention. For example, the polyamide and polyolefin layers 20, 24 may be subjected to a corona discharge or to primer layers.

The layers of the composite films 12, 14 may be readily laminated to form the composite packaging film of the present invention. This lamination may be performed by any of the means well-known in the art. The preferred means of forming the composite film of the present invention may vary in a known manner, dependent upon available machinery.

In the composite films 12, 14, it is desirable to face the metallized surface away from the product so that the metallized surface is spaced from the product by the thermoplastic material which is metallized. It is also desirable to have another film or coating over the metallizing so that the metallizing is protected from abrasion and from moisture. With aqueous products, the bond between the thermoplastic material and the metallizing may be destroyed if water penetrates it.

In order to obtain the maximum protection from oxygen (i.e., the lowest oxygen transmission) it is desirable to have a metallized coating weight equal to 2.5 to 3.0 optical density.

The thickness of any film used may be from 48 gauge (0.00048 inch) to 5 mils (0.005 inch), depending on the size of the package required. Usually, the films will range in thickness from 48 gauge to 0.0015 inch.

The adhesive layers may be between 0.75 to 3 pounds per ream, but is preferably 1 to 1.5 pounds per ream.

If a polyethylene extrusion lamination is employed, it may be from 5 to 30 pounds per ream but preferably 7 to 15 pounds per ream.

The following composite, flexible packaging films have been produced and have exhibited the desired properties of low oxygen transmission, flex crack resistance, good flexibility and high strength:

TABLE

| EXAMPLE | OUTER WEB 20 | MIDDLE WEB 22 | INNER WEB 24 |
|---|---|---|---|
| I | biaxial nylon (60 guage) | XMP-750 Mylar (50 guage) | SCLAIR (2 mils) |
| II | Propafilm C (110 guage) | metallized polyester (48 guage) | SCLAIR (2 mils) |
| III | Hercules B-503 polypropylene (100 guage) | XMP-750 Mylar (50 guage) | SCLAIR (2 mils) |

Once the composite, flexible packaging film of the present invention has been formed into rolls or sheets, they may be easily manufactured into bags, pouches and like containers as described above in connection with FIG. 1.

The packaging films of the present invention possess exceptional physical characteristics which permit their substitution for substantially stronger materials employed in prior art rigid containers. Also, they solve the major problem which has heretofore limited the utility of flexible films. The films of this invention successfully resist the cracking and rupture of the laminate which have accompanied past attempts to package substantial volumes of liquid or semi-liquid in a non-rigid container.

While particular embodiments have been chosen to illustrate the invention, it will be understood by those skilled in this art that various changes and modifications can be made therein without departing from the scope of the invention as defined in the appended claims.

What is claimed is:

1. A composite, flexible packaging film consisting essentially of an outer web of a balanced biaxially-oriented polyamide;
a middle web of metallized thermoplastic material, an inner web of heat-sealable polyolefin; and
at least one of said outer and middle webs having a vinylidene chloride polymer coating thereon.

2. A composite, flexible packaging film according to claim 1, wherein said polyamide is nylon.

3. A composite, flexible packaging film according to claim 1, wherein said vinylidene chloride polymer coating is provided upon said outer web.

4. A composite, flexible packaging film according to claim 1, wherein said vinylidene chloride polymer coating is provided on said middle web.

5. A composite, flexible packaging film according to claim 1, wherein said polyolefin is an ethylene copolymer.

6. A composite, flexible packaging film according to claim 1, which is formed in two sheets; said sheets being oriented one on top of another with their inner webs facing each other, said sheets being heat-sealed at their edges to form a flexible pouch.

7. A composite, flexible packaging film according to claim 1, wherein said middle web is metallized with aluminum.

8. A composite, flexible packaging film according to claim 1, wherein said middle web is metallized by vacuum deposition.

9. A composite, flexible packaging film consisting essentially of an outer web of balanced biaxially oriented thermoplastic material;
a middle web of metallized polyester material;
an inner web of heat-sealable polyolefin; and at least one of said outer and middle webs having a vinylidene chloride polymer coating thereon.

10. A composite, flexible packaging film according to claim 9, wherein said outer web is a polyamide.

* * * * *